United States Patent
Morton

(10) Patent No.: US 7,204,034 B2
(45) Date of Patent: Apr. 17, 2007

(54) METHOD FOR SPACING GUIDES ON FISHING RODS AND CHART FOR SPACING SAME

(75) Inventor: Donald Morton, Boaz, AL (US)

(73) Assignee: Renzetti, Inc., Titusville, FL (US)

( * ) Notice: Subject to any disclaimer, the term of this patent is extended or adjusted under 35 U.S.C. 154(b) by 21 days.

(21) Appl. No.: 10/887,155

(22) Filed: Jul. 8, 2004

(65) Prior Publication Data

US 2005/0034352 A1    Feb. 17, 2005

Related U.S. Application Data

(60) Provisional application No. 60/485,684, filed on Jul. 9, 2003.

(51) Int. Cl.
G01B 3/14 (2006.01)
A01K 87/04 (2006.01)

(52) U.S. Cl. ............................. 33/563; 33/1 B; 43/24

(58) Field of Classification Search ................ 33/562, 33/563, 566, 645, 1 B, 1 G, 1 SB; 43/24, 43/18.1 R, 1, 4
See application file for complete search history.

(56) References Cited

U.S. PATENT DOCUMENTS

| | | | | |
|---|---|---|---|---|
| 647,339 | A * | 4/1900 | Thompson | 33/1 N |
| 846,006 | A * | 3/1907 | Bryson | 33/486 |
| 972,528 | A * | 10/1910 | Halloran | 33/1 A |
| 1,357,386 | A * | 11/1920 | Devers | 33/1 A |
| 1,402,269 | A * | 1/1922 | Tanner | 33/1 A |
| 2,193,742 | A * | 3/1940 | Rohm et al. | 351/159 |
| 2,341,053 | A * | 2/1944 | Mason | 43/18.1 R |
| 2,532,061 | A * | 11/1950 | Glick | 434/217 |
| 2,615,625 | A * | 10/1952 | Youtcheff | 235/61 B |
| 2,747,795 | A * | 5/1956 | Kreuttner | 235/61 B |
| 2,992,484 | A * | 7/1961 | May | 33/1 B |
| 3,003,275 | A * | 10/1961 | Reid | 43/18.5 |
| 3,024,692 | A * | 3/1962 | Skeggs | 356/409 |
| 3,514,582 | A * | 5/1970 | Sanderson | 235/61 NV |
| 3,786,586 | A * | 1/1974 | Swan | 43/4 |
| 4,120,091 | A * | 10/1978 | Borgato | 33/1 SB |
| 4,599,820 | A * | 7/1986 | Hill | 43/4.5 |
| 4,696,109 | A * | 9/1987 | Whaley, Jr. | 33/1 B |
| 5,560,139 | A * | 10/1996 | Lembree | 43/24 |
| 5,598,657 | A * | 2/1997 | Akiba et al. | 43/24 |
| 5,832,653 | A * | 11/1998 | Tsurufuji | 43/24 |
| 5,915,943 | A * | 6/1999 | Grice | 43/25 |
| 6,360,475 | B1 * | 3/2002 | Lepage et al. | 43/23 |
| 6,584,725 | B1 * | 7/2003 | Elam | 43/25 |
| 6,854,190 | B1 * | 2/2005 | Lohmann | 33/1 SB |

* cited by examiner

*Primary Examiner*—G. Bradley Bennett
*Assistant Examiner*—Amy R. Cohen
(74) *Attorney, Agent, or Firm*—Eugene E. Renz, Jr., P.C.

(57) ABSTRACT

A chart for locating guides on a fishing rod comprising a plurality of side by side lanes each having a vertical portion and in a predetermined plane and arcuate lane portions of different radii and curved through an arc of about ninety degrees (90°) from said predetermined plane and a plurality of radially directed marker lines emanating from a common center and intersecting the arcuate lane portion which defines the optimum locating points for guides for the fishing rod.

2 Claims, 3 Drawing Sheets

METHOD FOR SPACING GUIDES ON FISHING RODS AND CHART FOR SPACING SAME

This application claims the benefit of Provisional Patent Application filed Jul. 9, 2003, Ser. No. 60/485,684.

FIELD OF THE INVENTION

The present invention relates to a novel method for spacing line guides on a fishing rod and a novel angle spacing placement guide facilitating easy and quick placement of guides on a fishing rod wherein the load is distributed more evenly when the rod is flexed or bent during a fish engaging event.

BACKGROUND OF THE INVENTION

Fishing rods come in a variety of sizes and vary widely in terms of power, tape and type of material. Presently the optimum spacing of line guides on a given rod is determined by known mathematical equations. Using this technique is rather arduous and time consuming and requires having precise specifications for a given rod.

It is therefore an object of the present invention which simplifies the placement of line guides on a rod thereby eliminating the need for the equation approach of achieving the desired spacing to yield optimum distribution of pressure in the line during use.

DESCRIPTION OF THE DRAWINGS

These and other objects of the present invention are hereafter set forth with reference to the accompanying drawings, wherein.

DESCRIPTION OF THE PREFERRED EMBODIMENTS

Guide spacing using the Angle Spacing Placement Grid (GPC) is based on the concept that guides (G) should be placed based on the way the rod (R) bends not on the length of the rod.

Figure 1:
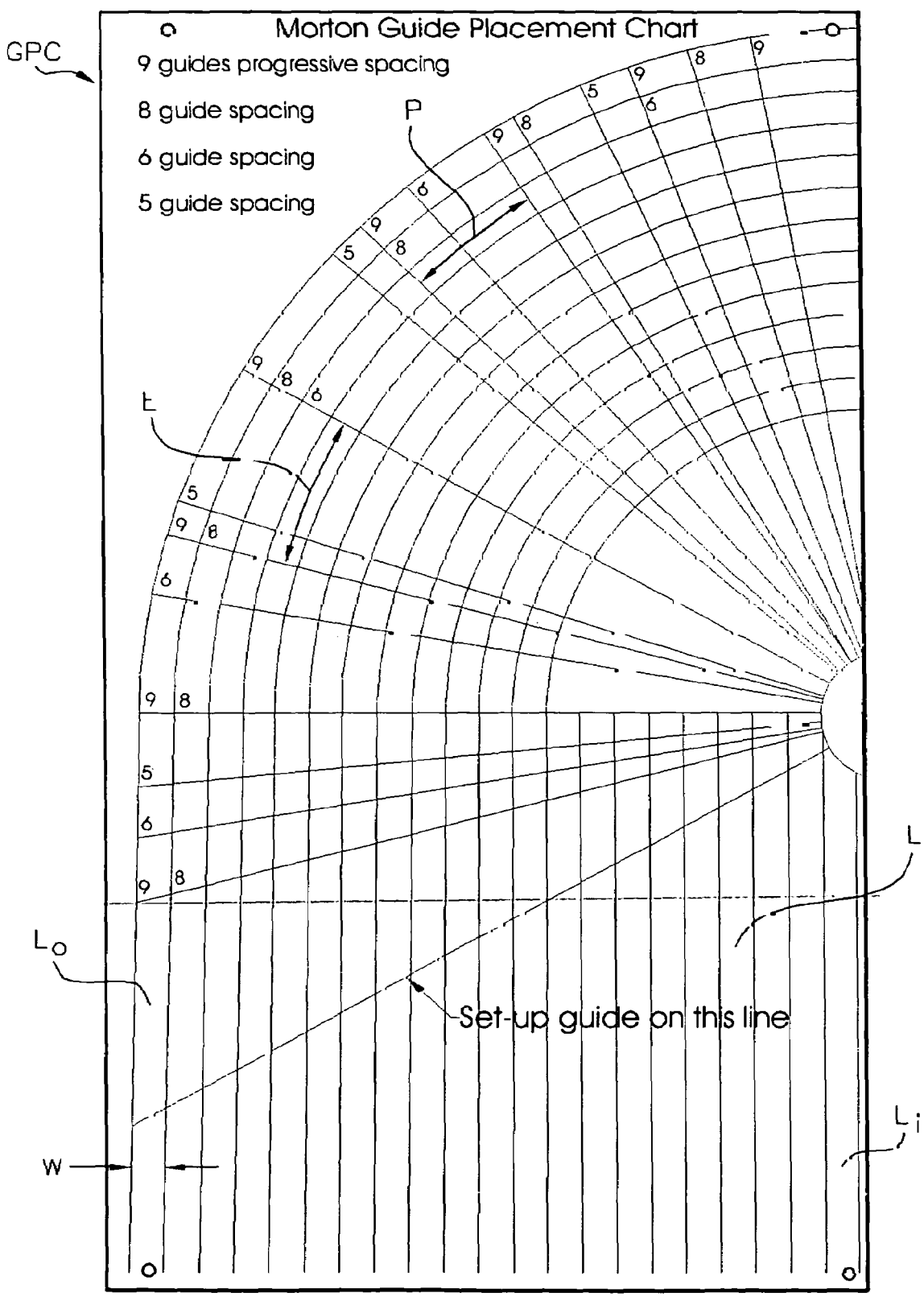
FIG. 1 shows the guide placement chart of the present invention.
Figure 2:
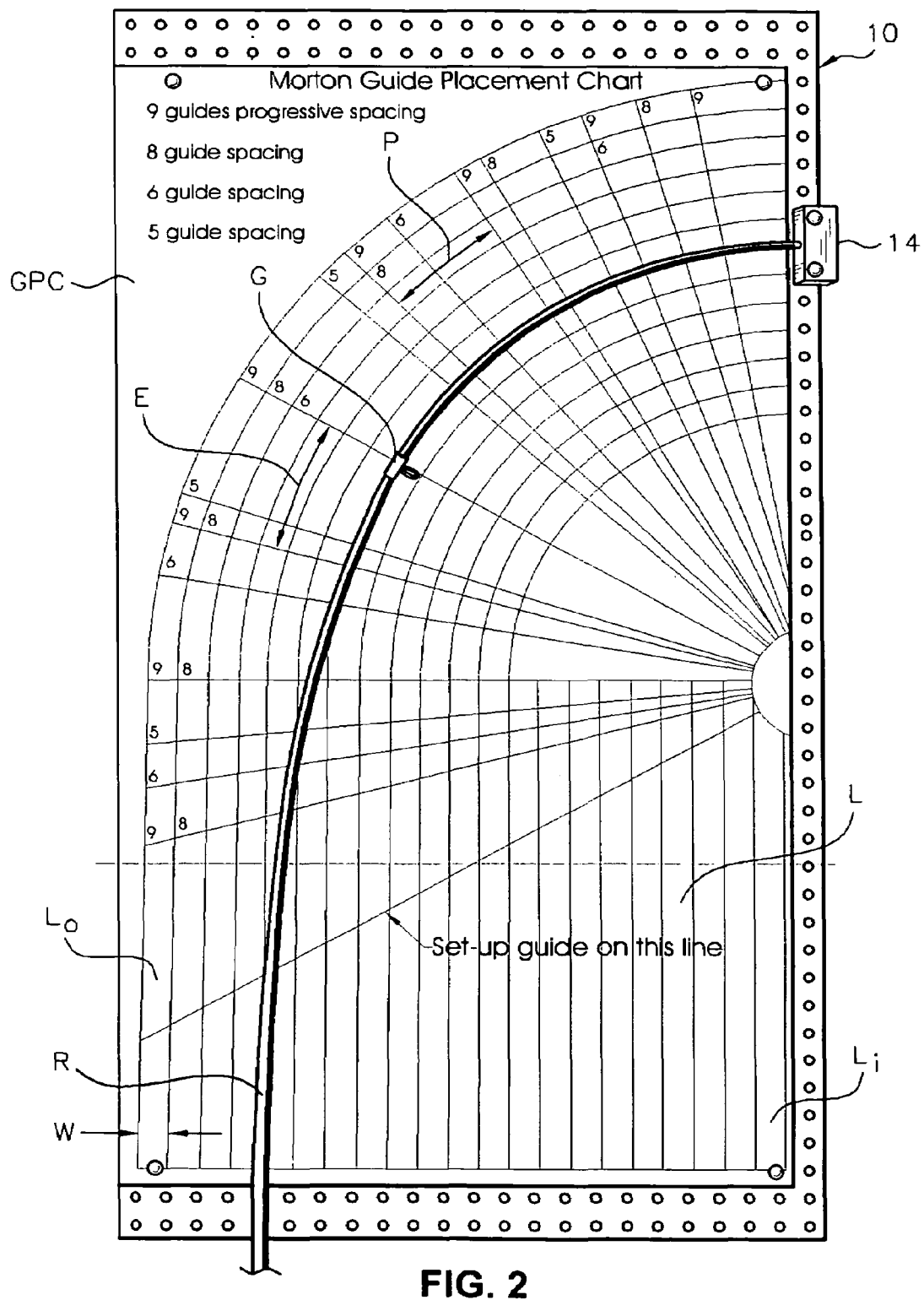
FIG. 2 shows a pegboard and rod in a flexed position used in applying the chart to determine guide spacing.
Figure 3:
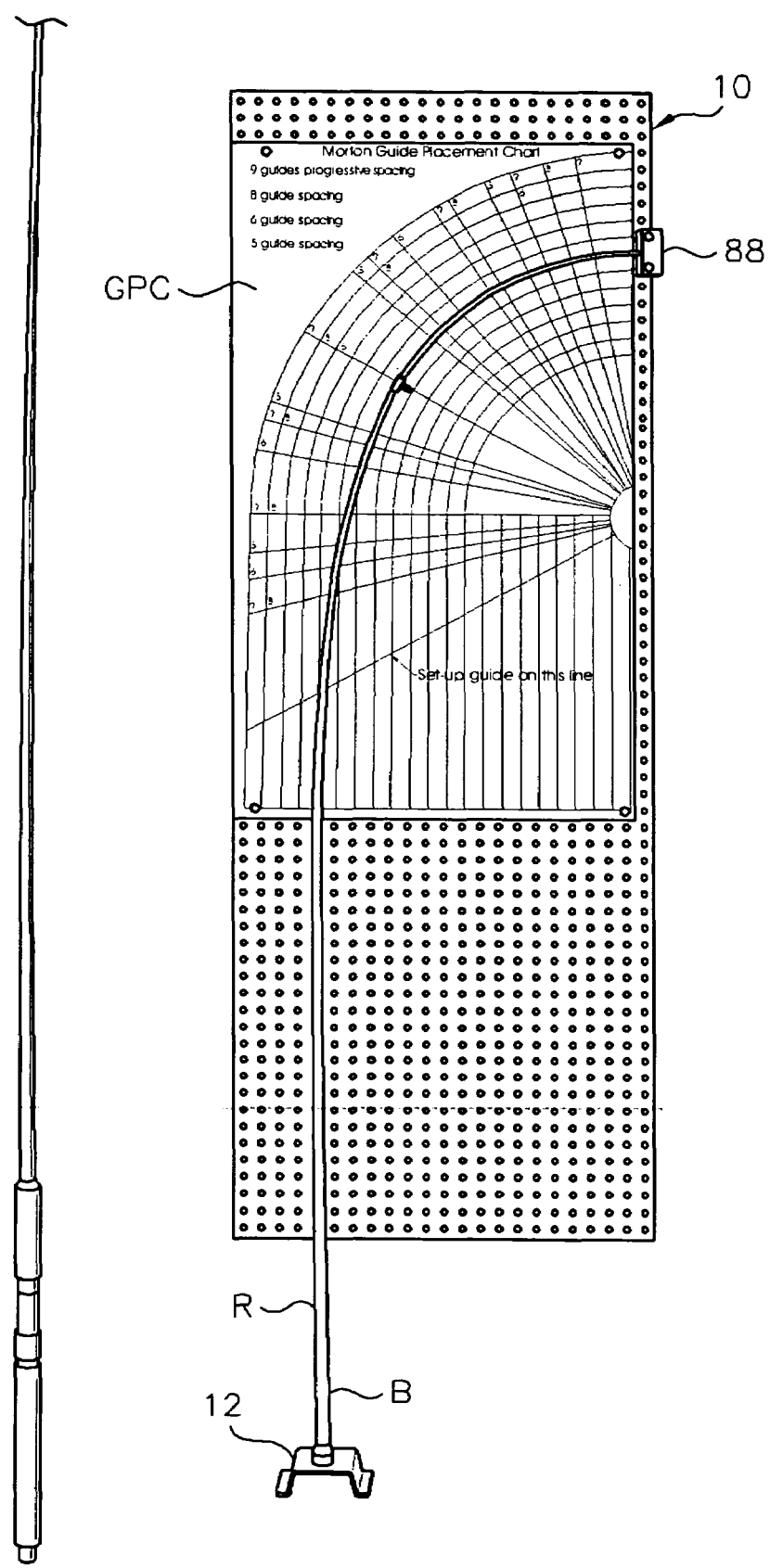
FIG. 3 is a view showing the chart, rod and pegboard.

Rods (R) have different amount of power, taper, and are used to perform a variety of fishing tasks. The angle spacing technique places the guides (G) using equal angles ( ) or progressive angles (B) as a spacing measurement. The guide placement grid (GPC) as shown in FIG. 1 has a series of lanes or pathways (Li) of predetermined width (W) which are curved or arcuate at the upper portion wherein the radius of the arc increases from the inner most lane (Li) to the outermost lane (Lo). The curved or arcuate portions of the lanes (L) are intercepted by a series of radially directed marker lines deferring the optimum locating points for guides (G).

Considering now briefly use of the chart, bend the rod (R) so the tip forms an angle of approximately 90 degrees with the butt section (B) to provide a constant position for setting the guides (G) on almost any type of rod. This bend is used, as it is the maximum bend the rod (R) should be subjected. In reality, the most pressure that can be exerted on a fish or fixed object is when the rod is completely straight and the pull is on the reel. In this case the line dictates the amount of pressure that can be exerted. By attaching a set of scales to the end of the line (20 feet away) and flexing the rod (R) through a series of angles up to 90 degrees, it will become evident that as the rod (R) is raised to approach the 90 degree mark the amount of pull or pressure exerted on the scales is reduced. Placing the guides (G) based on the bend of the rod will provide a better distribution of pressure, as the rod can be adjusted to control the angle the line makes as it passes through the guides (G).

The placement grid (GPC) allows the user to use a variety of positions when placing guides on a rod. The most common set-up position is with the placement grid (GPC) attached to a piece of pegboard (10) and placed in a vertical position (attached to the wall or a stand). If the vertical position is not appropriate due to height/length considerations, the placement grid (GPC) may be mounted in a horizontal position or placed flat on a table. Any of the mounting positions will work based on the user's preference and the space available. Most of the directions will be given for the vertical position but can be rotated for application with other mounting positions. The user should use a set-up that will allow for the rod (R) and the placement grid (GPC) to be moved in the guide placement process. The placement grid may be attached to the underside of a piece of Plexiglas for ease of handling and will provide a surface to draw the arc of a rod (R) and measure the angle the line makes with each guide before and guides are attached to the rod (use a dry erase marker to write on the Plexiglas). This is very important in guide placement, as it is possible to accurately place the guides based on the flex, power, and taper of the rod. Placing the rod (R) in different positions on the Plexiglas/placement grid and tracing the arc of the rod with different color dry erase markers, will allow the user to try and evaluate several guide placements without the necessity of taping several sets of guides of the rod. It also provides a much easier, quicker, and more accurate method to evaluate the line/guide angle, rod arc, flat spots, soft spots, and rod action before placing guides on the rod for test casting.

Rod and Placement Grid Set-Up

Setting up the placement grid (GPC) is not difficult. Locating the proper space may be the most difficult task in the set-up process. The most common set-up uses a 4 feet by 8 feet piece of pegboard (10) mounted to the wall or on a stand against the wall. The pegboard (10) will provide a surface to mount the placement grid (GPC), vertical spine finder (12), tip holder (14) and 2 feet by 3 feet piece of Plexiglas. In a normal set-up the pegboard is mounted in a vertical position. If this is not possible due to the height of the room, the pegboard (10) can be mounted horizontally or placed on a table. The primary concern is for space to be available to place the rod in front of the pegboard and have room to move around in front of it while setting-up the guide placement. Mounting the placement grid on the backside of a 2 feet by feet sheet of Plexiglas will make moving it around as you set-up the rod much easier. Although, as I mentioned earlier the Plexiglas arrangement is the most common but the same results can be obtained by taping the grid to a door or a wall although it is more difficult to move and the tape mess may be objectionable.

Vertical Set-Up

Begin by placing the blank in a vertical position in front of the placement guide (GPC). The butt may be placed on the floor in a vertical spine finder (12), mounted on the pegboard, on a marble placed on the floor, or just on a smooth floor (not on carpet as the rod will not rotate). Bend the rod (R) to approximately 90 degrees (no more) and locate the position on the pegboard or wall. Place the tip holder at that position, attach the rod, check the alignment and then remove the rod. Attach the placement grid to the pegboard with the right side aligned with the right side of the pegboard and with the center located about I foot below the tip of the rod. If you are using the wall, tape the tip or use a piece of cord to hold it at a 90-degree bend. Again the pegboard and Plexiglas are much easier but excellent results can be obtained using the wall as the stand. Compare the curve of the rod with the arcuate lanes (L) on the grid. You are looking for a close match with no part of the rod going below the arc lane (L) on the grid, If the bend of the rod goes below the line of the arc lane (L), this means that the guides will get closer together in that area. The arc line you are looking for is the last one that the rod stays above all the way around. When you go to the next larger arc the rod will cross it and be below the line some distance. Again, placing the guides closer to ether in that area. If you go to the next smaller arc lane (L), the rod will move away from the arc line (L) quickly as you move toward the 90 degree point, spreading the guides to much. Once you have the blank and the arc he matched you are ready to mark the guide placement. The rod blank will move away from the arc line as you approach the 90 degrees line. This will vary depending on the taper of the rod but in most cases the distance will not be more than 2 or 3 inches. You are right if you go to the next larger arc line and the rod goes below it, usually between about 45 degrees and 60 degrees. This will vary depending on the taper of the rod.

Horizontal or Table Top

If you envision pushing the vertical pegboard over and doing every thing from that position rather than the vertical position it will work just fine. The biggest problem is providing a stop for the rod butt to press against and hold the rod in position during the set-up. For the table top or even the floor, just tie a double clove hitch or some other knot that will not slip down the rod and bend the rod to 90-degrees (no more) and place it on the placement grid with the butt section matching one of the vertical line on the grid. Adjust the rod up or down the grid until you have a match with one of the arc lanes (L) at the top of the grid. Once the match is obtained you are ready to mark the guide placement. Regardless which position you choose, the task is matching the bend of the rod with the arc lane (L) on the placement grid guide you probably need to go with the next angle arrangement to add one more guide. Continue testing the tip guide set-up until the criteria is met.

GUIDE PLACEMENT

The process of placing guides on a rod is one area that is open to much discussion. How many, what size, what type, etc, are discussed and discussed with very few procedures being a greed upon. Guide placement based on a set of criteria rather than a set of measurement seems to be a better answer.

The Criteria

The set of criteria includes 7 factors to use in the placement of guides and for the total set-up of all fishing rods.
1. The line should run as straight as possible from the reel to the tip of the rod.
2. The line should form as small of an angle as possible with each guide.
3. The line should touch only the top or bottom of the guide in any fishing position.
4. The line should pass through the guides with no line chatter or line vibration.
5. The rod should be balanced.
6. The rod should be stable in all fishing positions.
7. The rod should track in all fishing positions with out experiencing torque or twisting.

If the rod set-up including guide placement fulfils these criteria and will track forward and backward without torqueing or twisting then the rod is set-up correctly.

Number of Guides

How many guides should a rod have is another question that does not have an absolute answer. The number of guides is dependent on a number of factors and was covered in the Volume 4 Issue #5 of the Rod Maker Magazine. Thus, each custom rod builder will have to analyze each rod to make a judgment as to the number of guides needed. For all practical purposes, use the smallest, lightest guides available for the fishing conditions for which the rod will be used.

Spacing

The task of spacing guides correctly does have an answer. First the guides should be spaced based on the flex or bend of the rod. Correctly spaced, the guides will support the rod, channel the line to the tip of the rod and transfer the energy in the rod to the line for longer more accurate casts. A technique for spacing the guides based on the flex or bend of the rod is called, "equal angle or progressive angle guide spacing". Equal angle or progressive angle guide spacing refereed to as angle guide spacing divides the rod into two parts. The tip section bends and the butt section remains basically straight. Guides are placed on the tip section based on the flex of the rod when it is bent to 90 degrees, with the butt section in a vertical position. Longer rods such as fly or surf casting rods may be placed in a horizontal position with the spine finder placed to hold the rod in a horizontal position. The 90-degree bend is the maximum bend that a rod should be subjected to as the rod has little strength or pull on the line at 90 degrees or more and is subject to breaking. Try this experiment, have a person hold the line and move 10 feet away, raise the rod to 90 degrees or straight up and pull on the rod/line and see how much pressure you can exert on the hand of the person holding the line. Now drop the rod to 45 degrees and do the same thing and see how much you increase the pressure on the line/person holding the line. The rod set-up is based on thinking of the rod as two rods, the tip that bends and the butt that remains basically straight. For the purpose of this guide placement technique, the 90 degrees bend is accomplished when the rod first flexes to 90 degrees when held in a vertical or horizontal position and the tip is bent to that angle by pressure applied to the tip.

Equal-Angle Guide Spacing

The equal angle approach is based on the concept that the guides should be placed on the rod according to how the rod bends. This is accomplished by placing the rod flexed to 90 degrees in front of a ray divided into equal angles. A guide is placed at the intersection of the angle lines and the rod. Since the rod is stiffer toward the butt, the bend is not a circle but an are with the butt part being further away from the center of the ray. As the rod moves further away from the center of the ray, the distance between the an-le lines is greater, thus placing the guides progressively further apart as they go down the rod. Placing guides according to distance between the guides may or may not work. Most rods are set-up using the distance theory and are used regardless of how the rod is designed in terms of power, taper or action of the rod. This type of set-up will produce a rod that will fish but will not use the potential inherent in the rod. A rod set-up based on the bend or curve of the rod will have the guides placed where the rod need them for support and line control. Placement of guides using the equal angle approach will not necessarily place the guides in the same position even on supposedly identical blanks. Very small differences in the amount and type bend in the blanks will place the guides a little different. Thus each blank dictates where the guides go based on the curve of that particular blank.

Progressive Angle Guide Spacing

This basic guide spacing set-up will work with almost any rod with only minor adjustments. One minor addition to the equal angle guide placement concept is the progressive angle guide placement. Progressive an angle guide placement adds usually one additional guide to the very tip of the rod to enhance the transfer of energy from the tip of the rod to the line during the casting motion. For example, if you have been using a 20 degrees spacing or 6 guides and want to go to a progressive spacing add angle lines at 10 degrees and 23 degrees. This will get you to the 40 degrees line. The rest of the angles will be at the 20 degrees lines used for your equal angle guide spacing. In this example, one additional guide is added at the tip of the rod. The rest of the rod will have the guides spaced as explained earlier. Other progressive arrangements can be used to add additional guides toward the tip of the rod. Angle lines at 10 degrees, 20 degrees, 32½ degrees and 45 degrees with the remainder 15 degrees apart will place 9 guides on the tip section of the rod and really add to the casting distance and make the cast exceptional smooth. An important caution, use only the smallest, lightest guides possible. Single foot Alconite or SIC titanium 6 mm guides work fine for at least the tip 6 or 7 guides on fly, spinning and casting rods. No, this does not look like a traditional rod or cast or fish like one either. Set a rod up using this technique, tape on the guides and cast it to see if you like, then carry it fishing and try it out. You may be surprised Vertical Spine Finder The next part of the tool is the vertical spine finder. The vertical spine finder consists of a cone set in a ball bearing. The butt of the rod is placed on the cone and allowed to turn freely. A small block of wood 1"×2" is placed at the right edge of the Plexiglas to hold the rod tip while spinning and during the rod set-up. This block of wood should have a ¼" hole drilled only ¼" deep to hold the tip of the rod. Don't drill the hole deeper as the rod may hang and break the tip. When the rod is flexed it will rotate to the most effective spine allowing not only for the guides to be placed but also the rod to rotate to place the guides correctly related to the spine of the rod. The vertical spine finder can be placed on the floor or attached to the pegboard. A variety of tools can be constructed to serve as a vertical spine finder and be attached to the pegboard using two ¼" wooden or metal pegs spaced to fit the pegboard holes. Something as simple as a 2"×2"×4" wooden block with a small indention that will hold a marble will serve fine as a vertical spine finder. Attach the block to the pegboard and place the butt of the rod on the marble and the tip in a small hole in a block of wood attached to the top right edge of the pegboard and you have a vertical spine finder.

Set-Up

The guide placement set-up now consists of a pegboard mounted to hold the Plexiglas panel. The panel is divided into equal angles for guide spacing. The vertical spine finder completes the set up board. Begin the rod set-up by holding the rod in front of the guide placement stand. Holding the rod vertical with the tip a little higher than the Plexiglas. Bend the tip to about 90 degrees and watch to see where the rod begins to bend (about from vertical), move that point on the blank to the 120 degrees line on the Plexiglas panel and mark where the butt is located. Place the vertical spine finder on the board at that point. If the spine finder is to be placed on the floor, move the Plexiglas to the point where the 120 degrees line is at the point where the rod starts to bend (½" from vertical). Place the tip holder at the right edge of the Plexiglas at a point where the rod is bending to just less than 90 degrees. This will give you the initial set-up. At this point the rod should be setting on the vertical spine finder with the tip in the tip holder and the rod spined. If you check, the most effective spine will be centered on the outside of the curve. Take the rod off the stand and double check the spine to be sure you are correct. If there is a question, make sure the rod is rotating freely on the vertical spine finder. Replace the rod on the stand and rotate the rod to feel the spines. Look at the ray (angle lines), The distance from the center up the 0 degree line to the tip, should be a little less than the distance from the center to the rod on the next angle line. Each line should be a little longer through the 120 degrees line. The gradual increase in distance between the centerpoint and the junction of the line and the rod blank will give a progressive increase in the distance between the guides. For final rod adjustments before placing the -guides conduct the following tests. First make sure the rod blank 'Is vertical (running up a line of peg holes). Check to see if the rod crosses the 120 degrees line at the point where it starts to bend (½" from the vertical). Adjust the rod to make these checks true. With the rod set in the holders (spine finders), take a string and hold one end of it at the center and stretch the other end to the rod tip (O degree line). Hold your finger at that distance on the string and move it around the curve of the rod. The rod should get progressively further from your finger on the string. This means that the distance between the guides is getting greater. If the rod has a very slow (progressive) action the distance between the guides at the tip will be greater than if the rod has a very fast action. Now the if's, if the rod has a very slow action and bends almost to the tip the 120-degree line may not match up with the ½" from vertical point. In this case use a string or radius from the center to the tip of the rod to place the rod on the Plexiglas ray. Holding one end of the string at the center of the ray, stretch the string to the tip of the rod and using that measurement move the string around the are of the rod. Your finger holding the end of the string should get a little further away from the rod as it moves around the arc. If your finger crosses the rod you need to lower the tip on the Plexiglas until your finger moves away from the rod as you move it around the arc. If your finger moves away from the rod very quickly adjust the rod on the Plexiglas so your finger moves away slowly allowing for a gradual increase in the distance between the guides. If the rod formed a perfect circle around the center of the ray the guides would all be equal distance apart. At this point it is helpful if you test several blanks to see the difference in guide spacing as result of the taper, power and action of the blank.

Placing the Guides

The placement of guides begins by deciding how many guides are needed to fulfill the criteria set forth earlier. As a general rule use only as many guides as are necessary to eliminate line chatter, support the rod and keep the angle formed as the line passes through the guide as small as possible. This should be accomplished by using the lightest and smallest guides possible to perform the task for a given rod. The idea that larger, heavier, double footed guides are necessary for most freshwater and light saltwater applications is not true. As matter of fact, very light, single footed guides will usually support more fishing pressure than most blanks will bear so don't be afraid to experiment with smaller, lighter guides. Keep in mind that the number of guides you decide on is only a starting point. Once the number is determined, place the rod on the guide placement stand and flex the rod and mark where the guides should be placed. There has always been disagreement on the side of the rod that guides should be placed. To insure that the rod will track (flex forward and backward in one plane) place the guides on the outside of the curve when the rod is spined. Double-check you spine, you are looking for the spot where the rod will lock in a position and move very little side-to-side. If the rod has a spine that will "lock the rod in," the spine will hold the rod in position on the cast and the guides located on the bottom of the rod will hold it in position on the retrieve. Tape a set of guides on the tip section of the rod. Run a line through the guides on the tip section and go through the criteria listed above. Bend the rod to 90 degrees and see what kind of angle the line makes with each guide. If the line forms a very large angle with any guide, you probably need to go with the next angle arrangement to add one more guide. Continue testing the tip guide set up until the criteria is met.

Butt Guide Placement

The tip guide placement can be done during any stage of rod construction. The butt guide placement requires the accurate placement of the reel seat and the handle assembly, as the reel must be in place to accurately place the butt guides. Although virtually ever custom rod builder uses a different assembly sequence, certain components must be assembled in a sequential order. For example, the handle must in place before the guides are wrapped. This sounds very simple but the exact positioning of the handle including the reel seat is critical for maximum performance. Before the handle is glued, the guides should placed and taped on to make sure that the rod will perform correctly. This includes going through the 7 criteria listed earlier and adding one more test. Mark the spine on the inside of the curve or on the inside curve of each section of a multi-piece rod as a reference point. Placed the handle on the rod (not glued) in relation to where you plan to place the guides. Place the rod between two tables or flat level surfaces, one supporting the butt and the other the tip. Look to see if the spines are lined up and facing up or at the 0 degree axis and the reel seat is in proper position. Press the rod at the middle and see if it rotates from the spine marks. If it moves something is not set-up correctly and additional adjustments must be made for the rod to function at maximum efficiency. This task is not as simple as it seems especially if you are working with a multiple piece rod. In many cases you have one section of the rod I8O degrees off and it will need to be turned over(180 degrees) for the rod to hold true or be "locked in". This set-up task is very important if the rod is to perform at its highest degree of efficiency and may take a great deal of time to get it exactly right. Once the spines line up exactly, position the reel seat and mark every thing before any thing is wrapped or glued. This is a good time to do some test casting to double check every thing. As you can see guide placement is much more than spacing guides.

The reel will need to be attached to the rod for placement of the guides on the butt section of the rod. Keep in mind that this section of the rod does not bend very much and is used primarily to channel the line to the tip section. As a result, the line should move through these guides without chatter or vibration and should only touch the top or bottom of the guide. If the line presses on the side of these guides it may twist the guide or break the finish around the guide foot as the guide is pushed to the side.

This can be determined while the guides are taped on the rod by fully flexing the rod and watch the angle the line makes as it passes through the guide. If the line forms an angle with the side of the guide then expect trouble. Guide set-up on the butt section is somewhat different for each type of rod.

Fly Rod Stripping Guides

The guides for a fly rod begin with the butt or stripper guide. With the reel attached to the rod, hold the rod in a normal fishing position and reach up the rod as if you were stripping line. Check the spot where you are reaching each time you strip.

Locate the stripper guide about 2" above that spot. The second stripper should be located about 4" above the first stripper. The third stripper should be located about 1.2 times the distance between the first two or about 4.8"–4¾". Try a fourth stripper located about 1.2 times the distance between the second and third strippers or about 5.8"–5¾" from the third stripper. This may seem to be over kill but we are trying to eliminate any line chatter or vibration as quickly as possible. A bit more heresy, use 10 or 12 mm, single foot guides for strippers. The remainder of the guides needed between the tip guides and the stripper guides should be spaced to prevent and line chatter. Most of the time 1.2 times the distance between the last two tip guides will give you a distance to work from and the 1.2 multiple will usually work on the remainder with some juggling required to make the two ends meet smoothly. The exact distance between the guides and the number of guides should be determined by test casting and using the 7 criteria set forth at the beginning. If these criteria are met it is correct regardless of other considerations. Once the guides are taped on using this spacing arrangement, test cast the rod and watch the line flow through the guides. The line should flow smoothly with very little chatter. Next if you feel there are too many guides on the rod take one off, rearrange the guides then test cast again. Try this until the rod starts to pick up chatter then add one guide back and you are probably correct. Most of the time the extra guides allow the rod to perform better, smoother, with longer and easier casts.

Spinning Butt Guide

Guide spacing for spinning rods require the placement of the butt guide to gather the line from the reel spool and squeeze it. With the reel attached to the rod and the tip guides taped on, place the butt guide and the next two guides you plan to use on the line and run the line through the tip guides and tie it to the rod. Reduce the drag on the reel until the handle will turn the bale without retrieving line. This allows you to see the line move around the ring in the guide. Turn the bale until the line is at the highest point on the rotation, move the butt guide up the line until the line just touches the top of the guide. Tape the guide to the rod and move the second guide up the line until the line just touches the top of it and tape it in position. Move the third guide up the line likewise and tape it in position. It is possible that the three guides are not enough or are may be one to many. Make adjustments accordingly. With the guides in position rotate the bale and watch the line as it traces around the ring in the guide. If properly placed the line will move around the butt guide and also the second guide, just touching the ring. If the butt guide is too far down the rod you may need to go to a higher guide or if it is too closer to the reel you may need to go to a lower frame guide or to a larger ring or a smaller ring to achieve the desired results, The same is true for the second guide. As a general rule, the line will not move much in the third guide as it will be choked and flowing in a straight line at the third ring. Test cast, test cast, test cast and watch the line to make sure it is flowing smoothly through the guides. Make adjustments until the set-up criteria are satisfied.

Casting Rod Butt Guides

Setting up a casting rod requires a little different approach. First the guides-on-top set-up cannot fulfill the set-up criteria. The rod will not be stable, the line will probably hit the side of the guides when fully flexed and the line will form an angle with the guides when fully flexed. As a result the spiral-wrap technique is recommended. The spiral wrap begins with the tip section guides being placed on the outside of the curve using the equal angle guide spacing. Place the handle assembly on the rod with the reel seat on the inside of the curve when the rod is spined. Tape the tip guides in place on the outside of the curve when the rod is spined. Attach the reel and place the butt guide and usually the next two butt guides on the line and then run the line through the tip guides and tie it to the tip of the rod. Reduce the drag to allow the line guide to move across the reel. With the line tight move the line guide to the side of the reel opposite the side that the line will spiral. Move the butt guide toward the reel until the line is centered in the butt guide. Tape the butt guide at that spot on the 0 degree axis. Now move the line guide to the other side of the reel. The line will usually just touch the side of the butt guide but not form an angle (no pressure is exerted on the guide). If an angle is formed when the line guide is moved to the spiraling side then move the guide away from the reel. Next move the second butt guide toward the reel around the rod to about 60 degrees. This will move the line away from the rod. Tape it at that position. Move the third butt guide up the line to about the 120 degrees position and tape it. With the line at the middle of the reel look down the line and see if the line is straight and only touching the bottom or top of each guide. Flex the rod and watch the line to see if it hits the side of a guide and forms an angle or puts pressure on the side of the guide. If it does, adjust the guide to eliminate the line from pressing on the side of the guide. The spiral wrap will satisfy the set-up criteria. Again flex the rod and watch the line then test cast it to make sure it is set-up correctly.

Even though particular embodiments of the invention have been illustrated and described herein, it is not intended to limit the invention and changes and modifications may be made within the scope of the followings claims.

I hereby claim:

1. A chart for locating guides on a fishing rod mounted on a peg board and comprising a plurality of side by side lanes each having a vertical portion and in a predetermined plane and arcuate lane portions of different radii and curved through an arc of about ninety degrees (90°) from said predetermined plane and a plurality of radially directed marker lines emanating from a common center and intersecting the arcuate lane portion which defines the optimum locating points for guides for the fishing rod means for mounting the butt end of the rod in a vertical spine finder (12) overlying the chart and a tip holder (14) for the tip of the rod which can be secured in a predetermined place in the peg board with the rod in a bent or flexed state whereby the rod can be flexed and bent and secured in a bent state by said tip holder so that the user can visually observe the arcuate lane in which the bent rod lies to determine the location of the guides.

2. The combination comprising a chart for locating guides on a fishing rod mounted on a peg board and comprising a plurality of side by side lanes each having a vertical portion and in a predetermined plane and arcuate lane portions of different radii and curved through an arc of about ninety degrees (90°) from said predetermined plane and a plurality of radially directed marker lines emanating from a common center and intersecting the arcuate lane portion which defines the optimum locating points for guides for the fishing rod and means for supporting the butt end of the rod overlying the chart and locking means for selectively flexing the tip end of the rod and secure it in a bent state overlying the lanes of the chart whereby the rod can be flexed and bent and secured in a bent state by said tip holder so that the user can visually observe the arcuate lane in which the bent rod lies to determine the location of the guides.

* * * * *